July 8, 1952 M. CURRY 2,602,729
APPARATUS FOR DETERMINING THE CONCENTRATION
OF A CHEMICALLY ACTIVE GAS IN AN ATMOSPHERE
Filed Dec. 20, 1946 2 SHEETS—SHEET 1
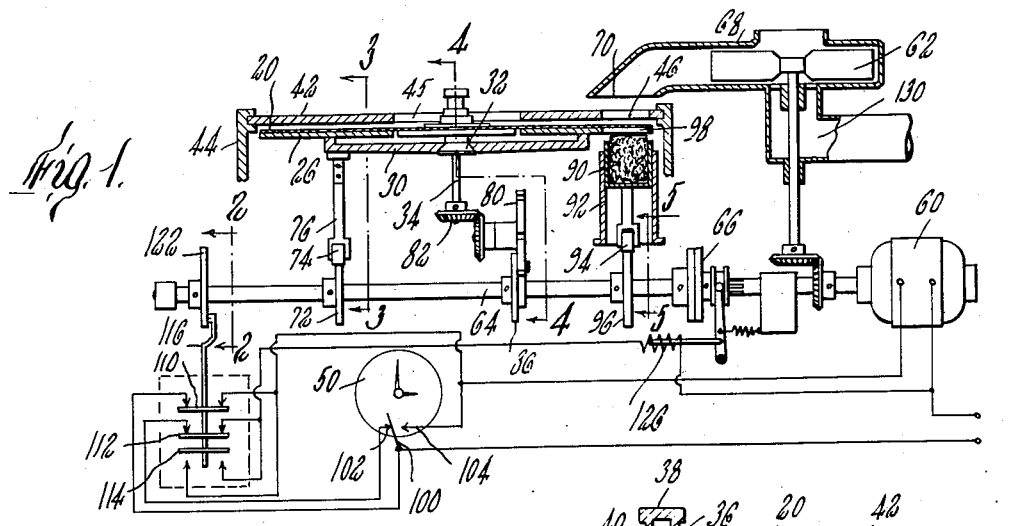
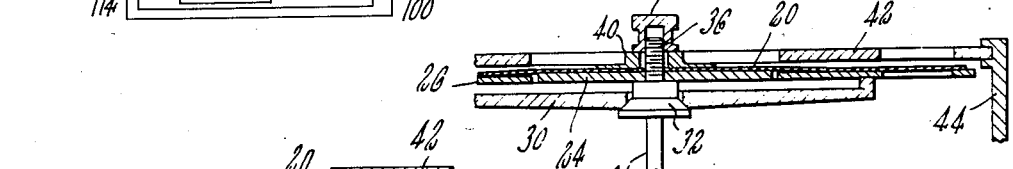
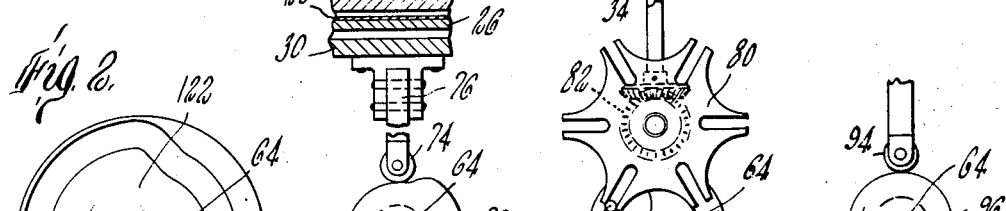
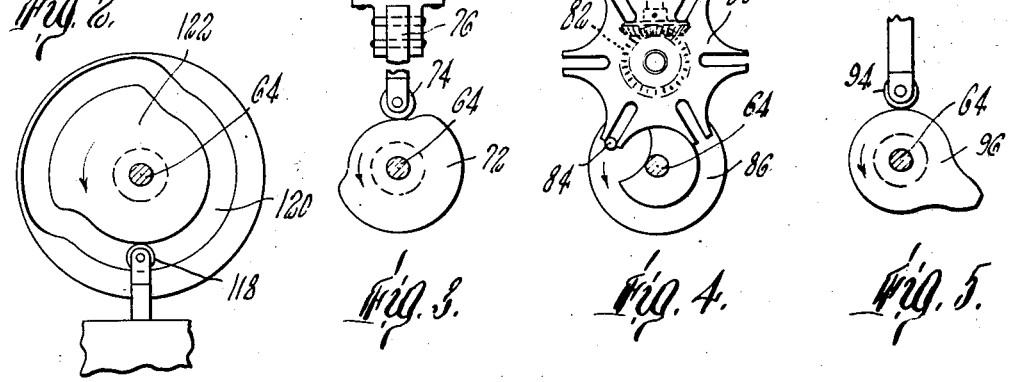
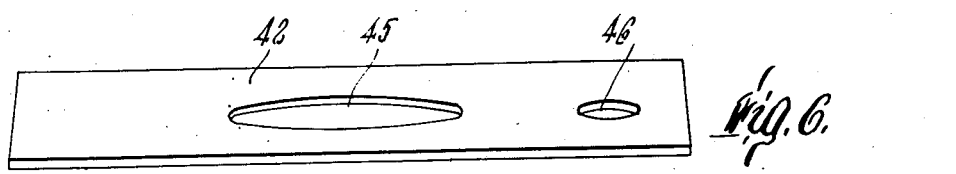
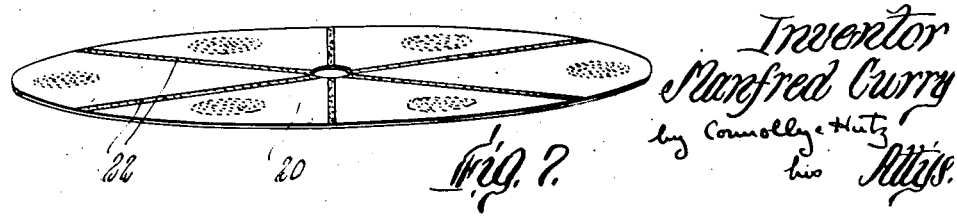
Inventor
Manfred Curry
by Connolly & Hutz
his Attys.

July 8, 1952
M. CURRY
2,602,729
APPARATUS FOR DETERMINING THE CONCENTRATION
OF A CHEMICALLY ACTIVE GAS IN AN ATMOSPHERE
Filed Dec. 20, 1946
2 SHEETS—SHEET 2
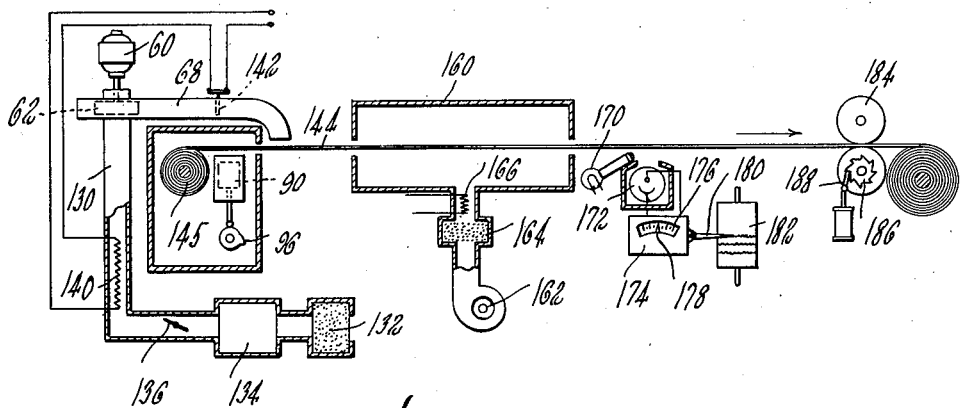
Fig. 8.
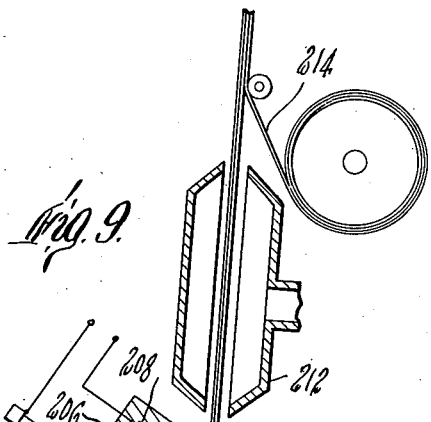
Fig. 9.
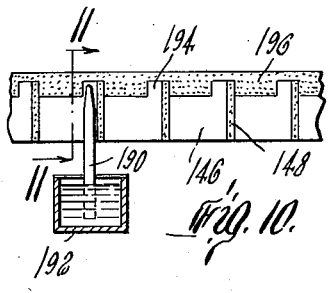
Fig. 10.
Fig. 11.
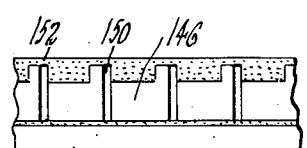
Fig. 12.
Inventor
Manfred Curry
by Connolly & Hutz
his Attys.

Patented July 8, 1952

2,602,729

UNITED STATES PATENT OFFICE 2,602,729

APPARATUS FOR DETERMINING THE CONCENTRATION OF A CHEMICALLY ACTIVE GAS IN AN ATMOSPHERE

Manfred Curry, Brockton, Mass.

Application December 20, 1946, Serial No. 717,440
In Germany October 30, 1941

6 Claims. (Cl. 23—255)

This invention relates to a method of and apparatus for testing the concentration in an atmosphere of a gas or gases which are sufficiently active chemically to cause some observable and measurable change in a substance exposed thereto.

More particularly the invention relates to the testing of an atmosphere to determine quickly and easily the concentration of oxidizing gases such as ozone therein. The customary methods of determining such concentrations are slow and tedious and must be performed by an experienced chemist. According to the present invention, apparatus is provided which can be successfully employed by persons having no knowledge of chemistry, and such apparatus can be made partly or fully automatic in operation.

In testing an atmosphere to determine the concentration of the oxidizing component thereof, according to the invention a stream of the atmosphere is directed against some substance which is capable of reacting with the oxidizing component of the atmosphere so as to be changed in some observable characteristic such as color. By standardizing the conditions under which the testing is performed, quantitative results can be obtained from the degree of color change. For example, in testing the concentration of oxidizing gases such as ozone in an atmosphere, I can employ a solution of starch and an iodide such as potassium iodide, with the addition of suitable buffers such as phosphates to maintain the pH of the solution at a proper value. The oxidizing component of the atmosphere which is directed against a surface or film of such mixture reacts chemically with the iodide to form free iodine which acts on the starch to turn it blue, the depth of the color thus formed being a function of the quantity of iodine thus released.

According to the invention, apparatus is provided whereby a stream of the atmosphere to be tested is directed against a moist surface of an iodide-starch mixture under controlled conditions, the resulting color depth, after a predetermined time interval of exposure, being interpreted in terms of percentage of oxidizing gas in the atmosphere. By the use of such apparatus, frequent tests can be made quickly and easily to obtain a progressive record of concentration during any desired period of time.

For a more complete understanding of the invention, reference may be had to the following description thereof, and to the drawing, of which:

Figure 1 is a view partly in section and partly schematic of the apparatus designed to perform the novel process of the invention;

Figure 2 is a section on the line 2—2 of Figure 1;

Figure 3 is a section on the line 3—3 of Figure 1;

Figure 4 is a section on the line 4—4 of Figure 1;

Figure 5 is a section on the line 5—5 of Figure 1;

Figure 6 is a perspective view of the cover plate of the apparatus;

Figure 7 is a perspective view of an absorbent pad used in the apparatus;

Figure 8 is a schematic view of a modified form of apparatus;

Figure 9 is a partial plan view of another modified form of apparatus;

Figure 10 is an elevational view of a portion of the absorbent strip shown in Figure 9 together with moistening means;

Figure 11 is a section on the line 11—11 of Figure 10;

Figure 12 shows a modified form of absorbent strip.

The apparatus shown in Figure 1 is designed to employ an absorbent pad in the shape of a paper disk 20 such as is illustrated in Figure 7. This disk is preferably divided into a convenient number of sectors by radial lines 22 of shellac or the like which form non-absorbent barriers between the absorbent sector areas of the disk. This disk may be supported on an underlying disk 24 and a surrounding annulus 26, both of these supporting members being non-absorbent. The annulus 26 is in turn supported by a frame 30 which rests upon a collar 32, the latter being secured to a vertical shaft 34, the upper end of which is threaded as at 36 to receive the small supporting disk 24 and a cap screw 38 by which the central portion of the paper disk 20 can be clamped to the disk 24. As shown, a loose washer 40 may be inserted between the paper disk 20 and the cap screw 38. Over the paper disk 20 is a plate 42 which may conveniently be the cover of a box 44 which may house most of the apparatus indicated in Figure 1, the box 44 itself being indicated by two short sectional fragments of its side walls. The box top 42 has a central aperture 45 concentric with the shaft 34. The box top is also preferably slidable in grooves on the box walls 44 so that the cover can be removed when it is desired to replace a paper disk 20. The box top 42 has also a smaller aperture 46 which is over a portion of the paper disk not far from its periphery.

In practicing the process of the invention, one of the absorbent sectors of the paper disk is moistened with a solution which is adapted to be discolored by oxidizing agent in the atmosphere to be tested. For example, a thin aqueous solution of starch and an iodide such as potassium iodide may be applied to the paper disk 20. The remainder of the disk is sealed from the atmosphere while a stream of atmosphere is directed against the freshly moistened area exposed through the aperture 46. This exposure to the atmosphere is maintained for a predetermined period of time which may be measured by a suitable clock 50 or equivalent device. At the end of such period the paper disk 20 is lowered sufficiently to permit rotation thereof so as to bring the next absorbent sector beneath the aperture 46. The plate 26 is at once raised to press the paper disk against the top plate 42 and thus to seal the disk from the atmosphere with the exception of a central exposed portion which is neglected and the portion exposed through the aperture 46. This latter portion is thereupon moistened as hereinafter described and the process is repeated. After all or a desired number of the sectors have been moistened and exposed to a stream of the atmosphere, the disk is removed from the apparatus and dried. By colorimetric tests of the discolored portions of the disk, determinations of the concentration of oxidizing agents in the atmosphere can be readily made. For this purpose a color chart can be employed having a series of progressively deepening shades for matching with the discolored areas on the disk, the color chart being calibrated in terms of percentage of concentration of oxidizing agents in the atmosphere. Or as hereinafter described, a photo-electric device may be used to measure the depth of color of the discolored areas, this device being used with or without a recording device by which a record can be made at frequent intervals of the values obtained for the concentration of the oxidizing agents in the atmosphere.

Referring to Figure 1, the apparatus therein shown may comprise a suitable driving motor 60 which drives a fan 62 and also a shaft 64, the latter being connected to the motor through a suitable clutch 66 which can be engaged and disengaged as hereinafter described. The fan 62 may be enclosed in a suitable blower housing 68 which serves to direct a stream through a discharge opening 70 toward the aperture 46. Figure 1 shows the apparatus at the stage of a cycle of operations in which the plate 26 which supports the paper disk 20 has been lowered for the rotation of the disk and the disk has just been advanced to bring the next successive sector beneath the aperture 46 so that the disk 20 is ready to be lifted again against the under surface of the top plate 42. For the elevation of the paper disk 20 a suitable cam 72 may be provided as shown in Figure 3, this cam being mounted on the shaft 64. On the edge of this cam rides a cam follower 74 which is carried by a leg 76 secured to the supporting frame 30. In actual construction a sufficient number of such legs 76 are provided, only one being indicated in Figure 1 to avoid confusion. When the cam follower 74 moves onto the high portion of the cam 72, the frame 30 is lifted from the collar 32 and thus raises the plate 26 and paper disk 20 until the latter is pressed against the under face of the top plate 42.

When the paper disk is lowered, as shown in Figures 1 and 4, the paper disk and its supporting elements are quickly rotated through a sufficient angle to move the next successive absorbent sector of the paper disk under the aperture 46 in the direction illustrated in Figure 7. Six sectors are defined, for example, by radial lines of shellac or the like so that each rotational movement of the paper disk advances it through an angle of 60°. For this purpose any suitable mechanism may be employed, a Geneva movement being illustrated in Figure 4. The slotted member 80 of this motion is connected by bevel gears 82 to the shaft 34, the step by step rotation of the member 80 being controlled by a pin 84 which is mounted on a disk 86, the latter being fixed on the shaft 64. The construction and operation of the Geneva movement is old and well understood.

For the moistening of the absorbent sectors, a moistening pad 90 is reciprocally mounted in a suitable cylinder 92. The moistening pad is reciprocated by a cam follower 94 which bears on a cam 96 mounted on the shaft 64. The moistening pad 90 is saturated with a suitable solution such as an aqueous solution of starch with an iodide and preferably also with buffers such as phosphates, and is moved upward to engage the disk 20 through an aperture 98 in the plate 26 which is directly beneath the aperture 46 in the top plate 42. As indicated in Figure 5, the shape of the cam 96 provides for an upward movement of the pad 90 at the proper time, followed at once by a descending movement.

The operation of the parts of the apparatus thus far described may be automatically controlled by electric circuits and switches such as are illustrated in Figure 1. The clock mechanism 50 is constructed to operate at predetermined intervals of time a suitable switch having a movable member 100 which can be moved into contact with a switch element 102 or a second switch element 104 in order to close one or the other of two electric circuits. The clock elements can be adjusted to alter the time intervals as desired. Cooperating with the switch 100 is a multiple switch consisting of bridging conductors 110, 112 and 114. These conductors are insulated from one another but may be mounted on a common support rod 116 which is movable by a cam follower 118 riding in a cam slot 120, the cam wheel 122 being mounted on the shaft 64. Each of the bridging conductors 110, 112, and 114 is arranged to move into and out of contact with a corresponding pair of switch contacts so that these bridging conductors are parts of three separate switches which are simultaneously operated by movements of the support rod 116. As indicated in Figure 1, when the rod 116 is lifted by its cam, the switches 110 and 112 are closed and the switch 114 is opened. Conversely when the rod 116 is lowered, the switches 110 and 112 are opened and the switch 114 is closed.

The clutch 66 may be magnetically operated by means of a coil 126, this coil being in circuits controlled by the switches 112 and 114.

A cycle of operations of the apparatus thus far described is as follows. Starting with the apparatus in the condition illustrated in Figures 1 to 5, inclusive, the paper disk 20 has just been rotated through an angle of 60°, the switches 102, 110 and 112 are closed so that the motor is operating and the clutch 66 is engaged. This means that the fan 62 is being rotated as is also the cam shaft 64. It is evident from Figure 3 that the plate 26 is about to be lifted to press the disk 20 against the under face of the top plate 42. When this has been done, cam 122 lowers the rod 116, thus simultaneously opening the switches 110 and 112 and closing the switch 114. The opening of the switch 112 breaks the circuit through the coil clutch 126, thus disconnecting the cam shaft 64 from the motor, and the opening of the switch 110 stops the motor since the switch 104 is at that time open. The entire apparatus is now at rest and remains at rest until the clock work 50 shifts the switch arm 100 to close the switch 104. Since the switch 114 is at that time closed, the closing of switch 104 starts the operation of the motor 60 and engages the clutch 66 so that the rotation of the shaft 64 is resumed. This soon results in the elevation of the moistening pad 90 to moisten the portion of the paper disk 20 which underlies the hole 46. The moistening pad at once descends and the cam 122 then operates the switches 110, 112 and 114 to the position shown in Figure 1. The opening of the switch 114 de-energizes the clutch coil 126 so that the clutch 66 becomes disengaged, thus stopping the shaft 64. The motor 60 however continues to operate the fan 62 so that a stream of atmosphere is directed through the aperture 46 against the moistened spot on the paper disk, this continuing through a predetermined time interval measured by the clock 50. At the end of such interval the clock operates to open the switch 104 and close the switch 102. The latter causes the clutch 66 to engage and the shaft 64 to resume rotation. This rotation soon causes the cam follower 74 (Figure 3) to ride onto the low portion of the cam 72, thus lowering the plate 26 and the paper disk 20 supported thereon. The Geneva movement shown in Figure 4 thereupon operates to rotate the plate and disk a step, bringing the apparatus to the point of the cycle illustrated in Figure 1. By suitably setting the switch operating elements of the clock 50, this cycle of operations can be made to repeat itself automatically in immediate succession or at desired intervals. When it has been repeated six times, the apparatus is stopped, the paper disk 20 removed and dried, the discolored parts being compared with a color chart to determine the depth of color on the spots as a measure of the concentration of oxidizing agents in the atmosphere during the testing periods. A fresh paper disk 20 is inserted in the apparatus, whereupon the cycles can be resumed.

Since the color depth of the spots on the paper disk depend on the rat of reaction of the solution with the oxidizing agents in the atmosphere to which it is exposed, and since such rate of reaction may depend in some measure on the temperature of the exposed surface, it is desirable to maintain the exposed surface of the paper disk at a substantially uniform temperature. This may be done by heating the air stream which is directed against the aperture 46. For this purpose an auxiliary stream of air may be supplied to the fan casing 68 through a conduit 130, the air supplied through the conduit 130 being purified, warmed and preferably moistened by apparatus schematically indicated in Figure 8.

A modified form of apparatus is indicated in Figure 8, this apparatus including a driving motor 60, a fan 62 within a fan housing 68 which draws atmosphere from the space surrounding the fan housing and also mixes with this stream an auxiliary stream introduced through a conduit 130. This auxiliary stream is first drawn through a filter 132 which may be in the form of a box containing activated charcoal which has the property of absorbing the oxidizing agents.

The air stream from the filter passes through a humidifier 134 where it is suitably moistened so as to prevent the air stream which impinges on the moistened pad from prematurely drying the moistened portion of the pad. The volume flow of the auxiliary air stream may be controlled by a butterfly valve 136 to regulate the proportion of the mixture. In order to maintain a constant temperature at the moistened surface where the chemical reactions take place, the auxiliary air stream may be warmed by a heating unit 140 which is preferably controlled by a thermostat 142 placed in the mixed air stream at a point just before it is discharged against the moistened absorbent paper.

The apparatus indicated in Figure 8 is characterized by the use of a long strip 144 of paper instead of the disk 20. This strip is preferably supplied in a roll 145, the strip being divided into separate absorbent areas by slots or non-absorbent areas. Figure 10 illustrates an absorbent paper strip in which absorbent areas 146 are separated by transverse bands 148 which are made non-absorbent by shellac or other suitable means. Figure 12 illustrates a strip in which absorbent areas 146 are separated by transverse slots 150 which extend part way across the strip, the connecting portions 152 and 154 being treated to make them non-absorbent. The connecting portion 154 is preferably of substantial width to receive data such as the date and time of the tests made by means of the successive absorbent areas 146, and any other pertinent data such as significant events occurring at such times.

As the paper strip 144 is drawn from the supply roll 145, the successive areas 146 are moistened by a reciprocating pad 90 which may be operated as hereinbefore described in connection with the mechanism shown in Figure 1, this pad being saturated with a solution of starch and an iodide to which may be added if desired buffers such as phosphates to maintain the pH number at a suitable constant value.

The freshly moistened area of the paper strip is moved into line with the stream of mixed air blown through the fan housing 68 and is held there for a predetermined interval of time after which the strip is again advanced so as to move the exposed area into a drier 160 and at the same time to move the next freshly moistened area opposite the discharge orifice of the fan housing 68. The drying apparatus may be of any suitable description as, for example, a housing into which is constantly introduced a stream of warm, purified air driven by a suitable fan 162 through a carbon filter 164 and heated by heating unit 166 before it enters the drier housing. The dried absorbent areas which have been discolored by action of the oxidizing agents in the air stream pass from the drier to a photo-electric device by which the degree of color produced on each area is accurately measured. Devices of this kind are well known, one being schematically illustrated in Figure 8. This consists of a lamp and lens unit 170 for projecting a beam of light against the discolored area. This unit may be arranged to shine through the paper strip or may be arranged on the other side to shine against it so that the photo-electric element 172 can receive either transmitted light or reflected light. In either event the element is connected to a galvanometer 174 having a dial 176 preferably calibrated to read in terms of concentration of the active agents in the atmosphere which is to be tested. An index 178 cooperates with the dial to indicate such concentration. In addition, a recording index element 180 may be provided with marking means arranged to make a continuous record on a sheet of paper mounted on a revolving drum 182. Any suitable means may be provided for feeding the paper strip 144 with a step by step movement. For example, feed rolls 184 are indicated, such rolls being driven by suitable means such as a ratchet wheel 186 cooperating with a magnetically operated pawl 188. By apparatus such as has been described, a continuous record of changes in concentration of oxidizing agents in an atmosphere can be made, the values of the concentration being noted at regular frequent intervals.

Another modified form of apparatus is indicated in Figure 9. This comprises an absorbent paper strip 144 which may be divided into separate absorbent areas 146 in the manner indicated in Figure 10 or in Figure 12. This paper is supplied from a roll 145 and is drawn at a constant rate rather than a step by step feed past a moistening device 190. As indicated in Figures 10 and 11, this device may be in the form of a tube with a fine bore of sufficiently small diameter to raise solution from a reservoir 192 by capillarity. The end of this tube bears lightly against the strip 144 so that solution is absorbed therefrom by the absorbent material of the paper strip. To prevent the absorption of an excessive amount of solution, the paper strip may be treated with shellac or other material capable of making it non-absorbent along portions of the path of contact of the tube 190 with the paper as illustrated in Figures 10 and 12. Thus as the paper strip travels, the tube engages absorbent surfaces for only brief intervals as at 194. In order to strengthen the strip and avoid breakage by feeding tension when it is weakened by being moistened, a backing strip 200 of cellophane or other suitable material may be joined to it from a conveniently located supply roll 202 to reinforce it. The strip 144 upon being moistened progresses past a fan 204 which blows atmosphere against it. As shown in Figure 9, the treated area is maintained at a substantially constant temperature by means of a heated block 206 against which it bears as it passes the fan 204. This block is heated by a unit 208 mounted therein and controlled by a thermostatic element 210 also mounted in the block adjacent to the bearing surface. The strip 144 and its backing strip 200 are fed at a suitable rate to permit sufficient exposure of the moistened areas for reaction with the oxidizing agents in the atmosphere blown against the moistened area. From the block 206 the strip moves through a drier 212 which may be similar to the drying apparatus 160 shown in Figure 8. As the strip emerges from the drier, a facing strip 214 of cellophane or other suitable transparent material may be joined thereto so that the strip is protected on both faces. The strip then proceeds to any suitable feeding and take-up mechanism (not shown), the color depth of the discolored areas being measured and indicated or recorded as hereinbefore described in connection with Figure 8.

I claim:

1. A unitary, electrically operated apparatus for automatically determining and recording the concentration of reactive agents in an atmosphere, which comprises an absorbent pad, an electrically driven fan for directing a stream of said atmosphere against said pad, electrically driven means for moving said pad through said stream of atmosphere, thereby exposing the surface of the pad thereto for a pre-determined interval of time, capillary means for contacting said pad and moistening it with a liquid that is reactive to said reactive agents, said capillary means being located in the path of travel of the pad prior and adjacent to its point of exposure to the stream of atmosphere, a drying chamber located about the path of travel of the pad subsequent and adjacent to its point of exposure to the stream of atmosphere, and means for supplying a stream of hot, dry atmosphere to said drying chamber, such means including an electrical heating device and a filter located in the path of the stream.

2. An apparatus as claimed in claim 1, wherein the driving means for moving the absorbent pad operates at a constant speed, the capillary means is in continuous contact with the absorbent pad, and the absorbent pad passes over an electrically heated block of metal while it is exposed to the stream of atmosphere.

3. An apparatus as claimed in claim 1, wherein the absorbent pad has a plurality of segregated areas and the driving means for moving said pad includes a clock-work mechanism imparting intermittent motion thereto.

4. An apparatus as claimed in claim 3, wherein the capillary means consist of a solution saturated wick that intermittently contacts the absorbent pad and is reciprocated by the driving means for said absorbent pad.

5. A unitary, electrically operated apparatus for automatically determining and recording the concentration of reactive agents in an atmosphere, which comprises an absorbent pad, a first conduit including an electrically driven fan for directing a stream of said atmosphere against said pad, said first conduit having an intake opening to the atmosphere and a second intake connected with a second conduit containing electrical heating means and a filter, with thermostatically controlled valve means for regulating the proportions of atmosphere admitted through the two intakes, electrically driven means for moving said pad through said stream of atmosphere, thereby exposing the surface of the pad thereto for a predetermined interval of time, capillary means for contacting said pad and moistening it with a liquid that is reactive to said reactive agents, said capillary means being located in the path of travel of the pad prior and adjacent to its point of exposure to the stream of atmosphere.

6. An apparatus as claimed in claim 5, wherein the absorbent pad has the shape of a disc, segregated into a plurality of sectors, said pad is provided with a cover having a relatively small opening at the point where the pad is exposed to the stream of atmosphere, and the driving means serve to rotate the pad intermittently, thus successively exposing individual sectors of the pad to the atmosphere stream.

MANFRED CURRY.

REFERENCES CITED

The following references are of record in the file of this patent:

UNITED STATES PATENTS

| Number | Name | Date |
|---|---|---|
| 691,249 | Dieterich | Jan. 14, 1902 |
| 1,146,531 | Smyly | July 13, 1915 |

(Other references on following page)

UNITED STATES PATENTS

| Number | Name | Date |
|---|---|---|
| 1,512,893 | Fulweiler | Oct. 21, 1924 |
| 1,919,858 | Pettingill | July 25, 1933 |
| 1,977,002 | Ljuggren | Oct. 16, 1934 |
| 2,049,947 | Cope | Aug. 4, 1936 |
| 2,056,663 | Foulke | Oct. 6, 1936 |
| 2,073,531 | Swisher | Mar. 9, 1937 |
| 2,105,226 | Pratt | Jan. 11, 1938 |
| 2,113,063 | Stryker et al. | Apr. 6, 1938 |
| 2,129,754 | Yagoda | Sept. 13, 1938 |
| 2,153,568 | Johnson | Apr. 11, 1939 |
| 2,174,349 | Littlefield | Sept. 26, 1939 |
| 2,176,462 | McAllister | Oct. 17, 1939 |
| 2,229,155 | Wenker | Jan. 21, 1941 |
| 2,232,622 | Moses et al. | Feb. 18, 1941 |
| 2,345,090 | Brace | Mar. 28, 1944 |

FOREIGN PATENTS

| Number | Country | Date |
|---|---|---|
| 25,958 of 1902 | Great Britain | Sept. 3, 1903 |
| 379 of 1915 | Great Britain | Dec. 16, 1915 |
| 264,820 | Great Britain | Dec. 1, 1927 |
| 396,672 | Great Britain | Aug. 10, 1933 |
| 494,882 | Great Britain | Nov. 2, 1938 |

OTHER REFERENCES

Lunge, "Technical Gas Analysis," pages 219, 220, Van Nostrand and Co., 1914.